April 18, 1961     W. S. ROUVEROL     2,979,970
VARIABLE SPEED TRANSMISSION

Filed Dec. 9, 1957     5 Sheets-Sheet 1

INVENTOR.
William S. Rouverol
BY
Boyken, Mohler + Wood.
Attorneys

INVENTOR.
William S. Rouverol
BY Boyken, Mohler & Wood.
Attorneys

INVENTOR.
William S. Rouverol
BY
Boyken, Mohler & Wood.
Attorneys

April 18, 1961 W. S. ROUVEROL 2,979,970
VARIABLE SPEED TRANSMISSION
Filed Dec. 9, 1957 5 Sheets-Sheet 5

INVENTOR.
William S. Rouverol
BY
Attorneys

United States Patent Office 2,979,970
Patented Apr. 18, 1961

2,979,970
VARIABLE SPEED TRANSMISSION
William S. Rouverol, 1014 Shattuck Ave., Berkeley, Calif.
Filed Dec. 9, 1957, Ser. No. 701,525
17 Claims. (Cl. 74—796)

This invention relates to loading devices for developing traction in variable speed friction transmissions. In particular it relates to improved means for applying a uniform pressure against one side of a rotatable member or disk over an area substantially corresponding to and coaxial with the area swept by the balls of a multiple-ball transmission of the type described in copending U.S. patent application, Serial No. 611,485 and in German Patent 928,749 (Schnabel).

Although tractive friction provides the basis for a number of variable speed transmissions, the small torque capacity of such devices has constituted a serious limitation on their usefulness. This difficulty was partly overcome by the invention of the multiple-ball transmission. However, the full advantages of using a plurality of rolling elements can be realized only if each element is able to make substantially the same contribution to the total torque as it could if used alone.

Development of the full tractive capacity of each ball obviously requires that the normal load on each ball be the same. Since the coefficient of tractive friction is much lower for combined rolling and sliding than for pure rolling, any ball which loses traction due to insufficient normal load immediately transfers most of its tractive load to adjacent balls, and if these balls are already carrying considerable tractive load, a cascade of slippage may be initiated. Torque capacity of a multiple-ball transmission might thus be considered as limited primarily by the magnitude of the smallest normal load applied to any ball.

The problem of distributing the normal load did not arise in prior art devices of the ball transmission type, since only one rolling element was interposed between the rotatable disks. In the multiple-ball transmission, however, failure to provide a proper method of applying normal load may result in a drive which is practically inoperable. This is because the local elastic indentation under each ball is extremely small compared to ordinary bending deflections existing in the rotating disks. Even especially heavy construction with built-in misalignments to anticipate bending deflections can only partially remedy the difficulty.

The object of the present invention is therefore to provide means for applying pressure through the cage of a multiple-ball transmission in a way which insures that all balls will carry an equal normal load. This is accomplished in the preferred embodiment of the invention, by directing the uniform pressure in a confined fluid against one side of a disk over an area corresponding to and coaxial with the area swept by the balls on the opposite side of the disk. Such loading produces no significant bending deflections in even a comparatively thin disk if the opposed disk is constrained to remain flat. If the opposed disk is supported in such a way as to deform under load, application of this type of loading to a disk of reasonable flexibility will cause it to remain equidistant from the deformed disk throughout the region engaging the balls, and thereby also insure equal loading on all balls.

A further object of the invention is to provide a simple and compact means for developing and maintaining, or varying as desired, the pressure of the confined fluid, and to provide a method of sealing the fluid from other parts of the transmission so that a different fluid might be used than is used to lubricate the cage and so that the amount of fluid continuously supplied is minimized. An additional object of the invention is the provision of means for exerting an active pressure against a disk, urging it toward another element with a force which is maintained at a uniform amount even though the element recedes slightly due to elastic deformation or wear. This object is achieved by incorporating a resilient member, which may be the seal if one is used. Another important advantage of the invention is that it offers the minimum of frictional resistance to either rotation or lateral shifting of the disks.

Other objects and advantages of the invenion will be seen from the following specification and drawings.

Figure 1:
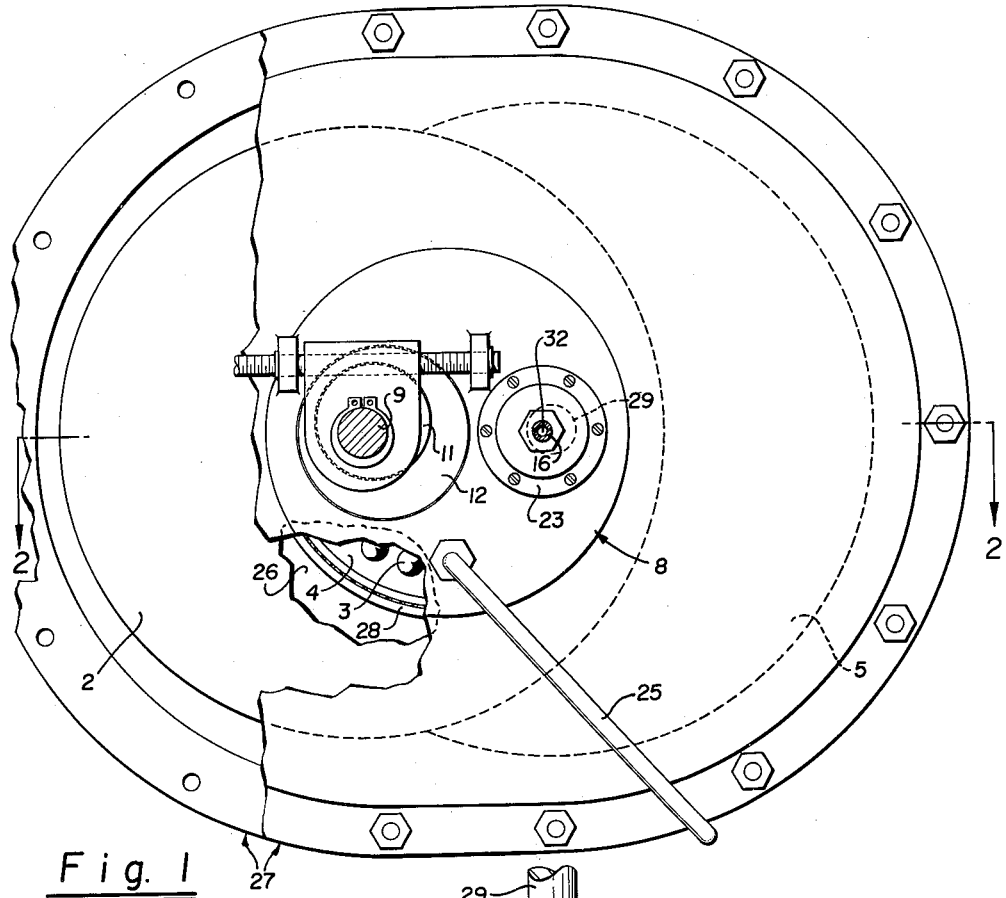
Fig. 1 is an elevation of a transmission embodying one form of the invention with portions of the housing broken away to show internal structure.
Figure 2:
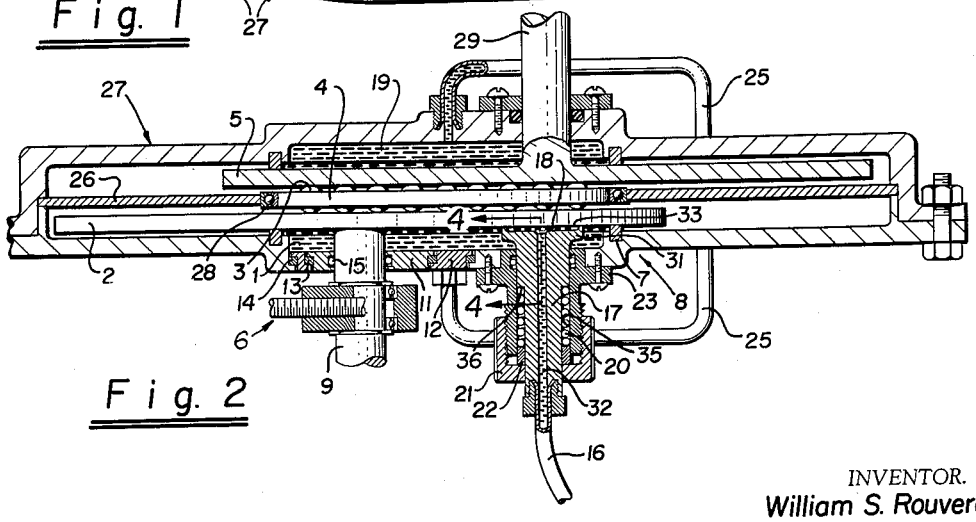
Fig. 2 is a cross section of the device of Fig. 1.

In detail, and referring to Figs. 1, 2, the invention may be employed with a "ball and disk" type of transmission wherein a driving shaft 9 is provided with a drivink disk 2 at one end thereof which in turn is engaged on its side opposite shaft 9 by the balls 3 of a cage 4 of the type shown in U.S. application Serial No. 611,485.

The cage 4 is interposed between said disk 2 and a similar disk 5 attached to the driven shaft 29 and may be rotatably supported on a large peripheral bearing 28 which in turn is fixed relative to the housing 27 by means of a support plate 26.

One side 8 of the housing 27 is provided with a relatively large circular oil seal 7 in sealing engagement with the adjacent surface of disk 2 and which seal cooperates with the housing side 8 to provide a chamber 1 for receiving a fluid such as oil therein. A pair of inner and outer eccentric closure plates 11 and 12 respectively are provided in side 8 and these plates are rotatably supported as shown in Fig. 2 to permit radial movement of shaft 9 relative to the housing 27 as by adjusting means generally designated 6. Fluid seals 13, 14 are provided for closure plates 11, 12 respectively and an O-ring seal 15 may be employed between the rotatable shaft 9 and the inner eccentric plate 11.

Extending through the side 8 of the housing 27 is a pump body 17 which is mounted in a supporting housing 23 secured to side 8 of the transmission housing 27. Pump body 17 may be generally cylindrical in form (Figs. 2, 3, 4) and is provided with an enlarged generally rectangular head 31 which is positioned in sliding engagement with the adjacent side of disk 2. It will be understood that the exact shape of pump body 17 is not critical. An axially extending through bore 32 is provided in pump body 17 and terminates in a cross groove 18 formed in the outer surface 33 of head 31. Between the groove 18 and the outer edges of surface 33 the head is tapered as shown greatly exagerated in Fig. 4 so as to cause an induced flow of fluid through bore 32 and outwardly of surface 33 upon rotation of disk 2.

Oil or other suitable fluid is conducted to the pump 17 from a suitable source through a conduit 16 which is connected to the end of bore 32 opposite the head 31.

As seen in Fig. 2 the pump body 17 is slidably secured in a bore 35 formed in a supporting housing 23 which in turn is externally threaded to receive a cap 21. Interposed between an intermediate shoulder 36 of pump body 17 and cap 21 is a helical compression spring 20 which urges head 31 toward disk 2. A follower 22 may be inserted in cap 21 to form an abutment for spring 20 and an O-ring seal may be provided around pump body 17 to prevent leakage from chamber 1. By this structure the force urging head 31 into slidable engagement with disk 2 may be varied by turning cap 21.

The operation of the above described structure is as follows: Upon rotation of disk 2 the wiping action between the head 31 and disk 2 induces a flow of fluid through bore 32 and into chamber 1. Upon continued rotation of disk 2 fluid pressure in chamber 1 is built up and such pressure may be varied as desired by adjustment of cap 21 inasmuch as the pressure differential developed by the wiping action of pump 17 is directly related to the force of spring 20.

The pressure developed in chamber 1 is directed against disk 2 and, if chamber 1 is positioned so as to be coextensive in area with the cage 4 as shown in Fig. 2, it is apparent that a uniformly distributed force is applied over the disk 2 to back up the latter against the generally uniform loading of the balls. In other words, a relatively thin disk 2 may thus be employed to give the same or better support as could be obtained by a relatively thick plate, thus obviating slippage and loss of traction.

Since the driving shaft 9 is mounted for radial movement, adjustment of the speed ratio between said shaft and driven shaft 29 is thus provided without movement of the cage being required. It will be obvious, however, that the principles of the above described structure may be applied to a ball and disk type of transmission in which the cage may be shifted in which case the pressure chamber is also shifted.

It is apparent that other devices may be employed to control the pressure in chamber 1 in lieu of spring 20. For example, a solenoid, mechanical linkage, a diaphragm or a piston. In the event that disk 2 is formed to a shape other than planar, for example spherical or conical, it is obvious that the wiping surface 33 may be modified to provide the desired pumping action.

By means of a pressure equalizing tube 25 (Fig. 1) a similar fluid pressure may be applied to the corresponding side of disk 5 from a chamber 19 on the opposite side of housing 27.

Figure 5:
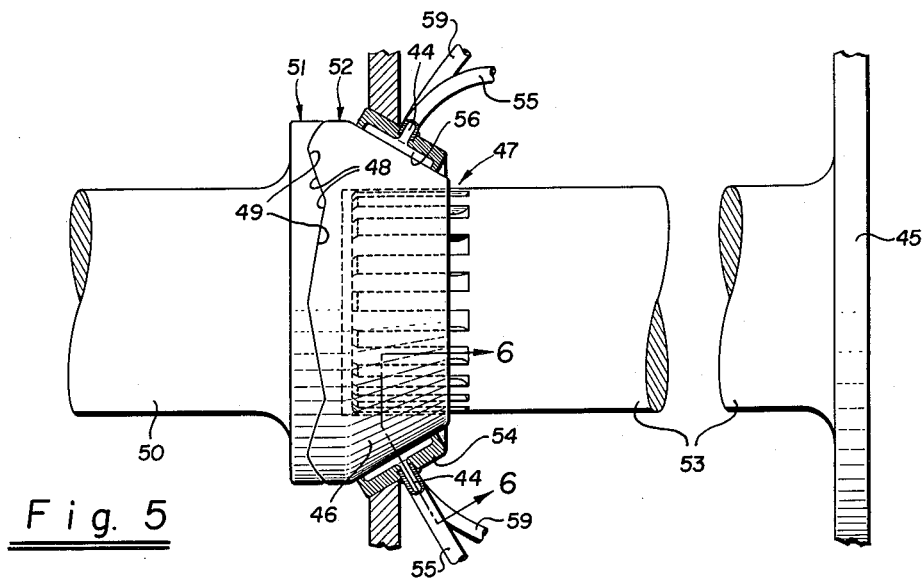
Fig. 5 is a side elevation of a driving shaft showing means for developing an oil pressure bearing a relation to the torque transmitted by the shaft.
Figure 6:
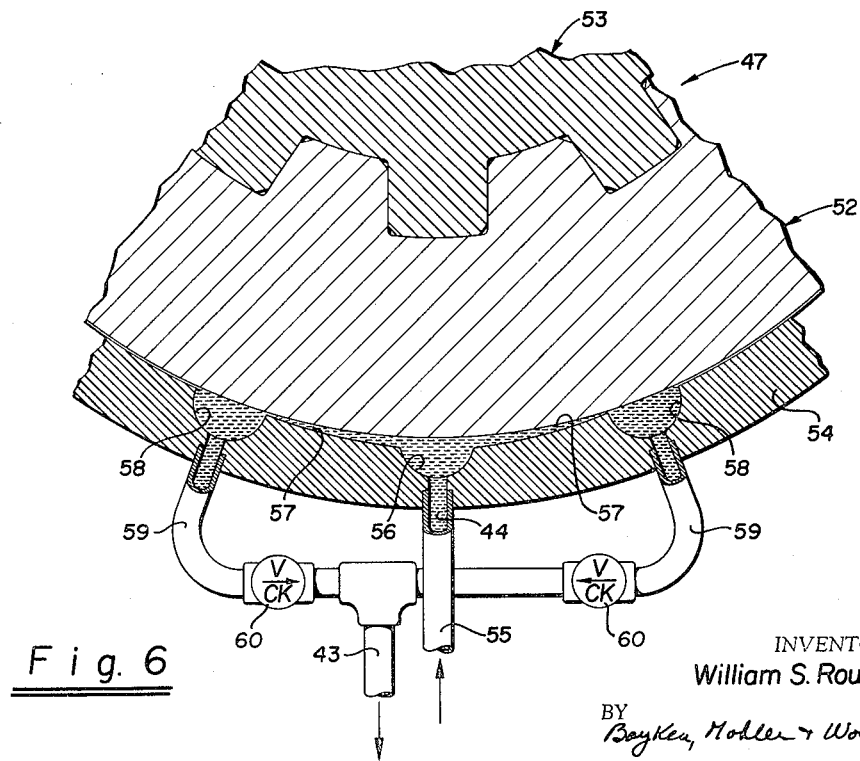
Fig. 6 is a greatly enlarged fragmentary cross section through the device of Fig. 5.

Figs. 5, 6 illustrate the use of a viscosity type pump such as above described for the purpose of applying pressure to the disks in proportion to the torque to be transmitted through them. In this connection it should be noted that maximum efficiency in any friction drive is achieved when the normal loading on the rolling elements is no greater than that needed to transmit a particular desired torque. In other words, by providing for variation of the pressure applied to the disks optimum efficiency may be achieved at all times regardless of changes in the torque transmitted.

Figure 7:
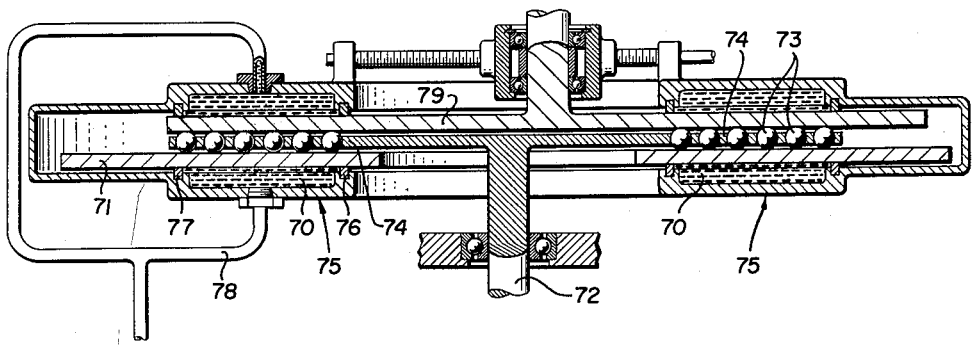
Fig. 7 is a cross section of another form of transmission showing a modification of the pressure applying means.

The device of Figs. 5, 6 may be applied to the driving shaft which is divided to provide an input section 50 and an output section 53, the latter being provided at its end with either a driving disk 45 (Fig. 5) or, if the arrangement shown in Fig. 7 is employed, with a cage.

Section 50 of the input shaft is provided with an enlarged end 51 the axially directed face of which is provided with biased surfaces 49 in engagement with complementarily formed surfaces 48 on a generally frustoconical dog 52. Dog 52 is connected to section 53 of the input shaft by a splined connection generally designated 47 to permit axial shifting of said dog relative to said section 53.

Figure 4:
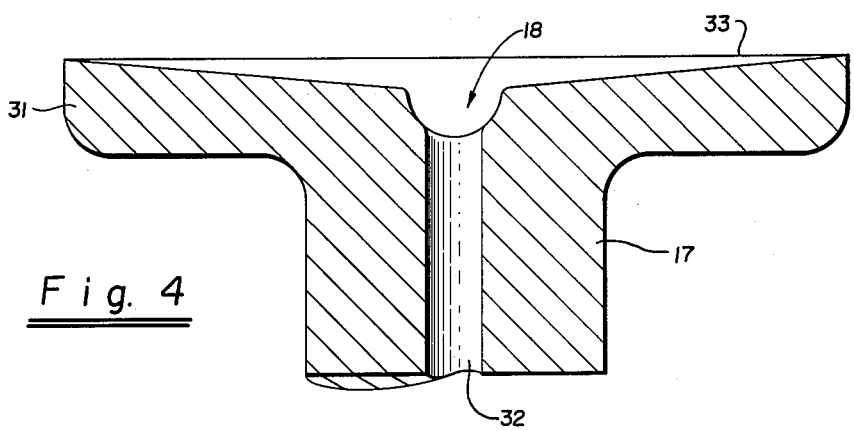
Fig. 4 is a cross section through the pump unit of Fig. 3.

The outer conical face 46 of the dog 52 is formed to abut a complementarily shaped generally annular fixed pump body 54 formed with transversely extending grooves 56 which are analogous in function to the cross groove 18 of Fig. 4. As best seen in Fig. 6, the inner face of annular body 54 is tapered circumferentially in opposite directions toward a pair of cross grooves 58 so that, regardless of the direction of rotation of dog 52 a pressure gradient is established due to the viscosity of the fluid from the central groove 56 to the grooves 58.

Fluid is supplied to the annular pump body 54 through a conduit 55 which communicates with groove 56 through a bore 44 (Fig. 6) and fluid under pressure is discharged from the viscosity pump through conduits 59 which may be connected to a common conduit 43. A pair of check valves 60 may be provided in conduits 59 to prevent backflow into the one of the two cross grooves 58 in which no fluid pressure is built up.

In operation, transmission of torque through section 53 from section 50 of the driving shaft in either direction of rotation tends to cause dog 52 to move away from the section 50 and to bear against the fixed annular pump body 54 with a force proportional to the torque impressed on said dog.

Rotation of dog 52 causes the low pressure fluid entering groove 56 from conduit 55 to be drawn viscously from said groove through the converging channel 57 formed by the tapering of body 54 to one or the other of the discharge grooves 58 depending on the direction of rotation. The fluid is thus discharged through conduits 59 into conduit 43 at a considerably higher pressure. Since the pressure of the discharged fluid is proportional to the force with which dog 52 engages the pump body 54 the pressure in conduit 43 will be proportional to the torque transmitted.

It is apparent that the fluid in conduit 43 may be employed in a pressure chamber applied against a disk in accordance with the principles set forth above in connection with Figs. 1, 2 except that a viscosity pump such as pump 17 (Fig. 2) is not required—its function being performed by the pump 54.

The present invention also contemplates other means for developing an axial force proportional to the torque in a shaft such as a jackscrew or a resilient disk interposed between the two sections of the shaft and which disk would tend to alter in length in response to an imposed torsional shear.

In Fig. 7 a modified form of the invention is shown wherein the cage 74 containing balls 73 is annular in form rather than circular and is centrally secured to the driving shaft 72. In this case the pressure applying fluid is contained in an annular chamber 70 formed in a side 75 of the housing and has substantially the same projected area as the ball receiving portion of the cage 74. Since such construction would ordinarily be employed with an annular disk such as shown at 71 (Fig. 7) and through which the shaft 72 passes no balls can be placed in the center of the cage. For this reason no fluid sealed eccentrics are required.

Figure 3:
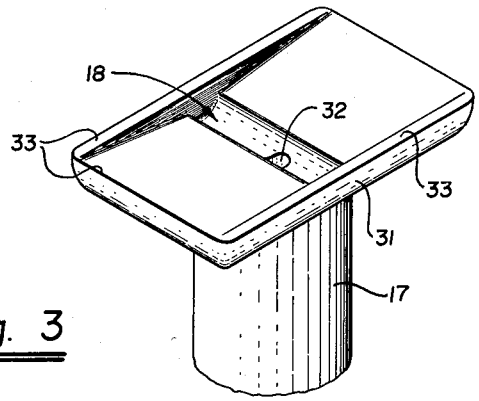
Fig. 3 is an enlarged perspective of the pump unit.

In this construction an inner fluid seal 76 is interposed between the housing side 75 and the disk 71 and also an outer seal 77. Fluid may be supplied to chamber 70 from a pump or other source of pressure (not shown) through conduit 78 or may be obtained from the viscosity pump shown in Figs. 5, 6 if it is desired that the fluid pressure vary with torque. Use of an integral viscosity pump of the type shown in Figs. 2, 3, 4 is, of course, also possible. The driven disk 79 that is connected to the driven shaft is provided with the same sort of pressure applying means that acts on driving disk 71. Also, an equalizing cross connection between the pressure chambers for the opposed disks is provided to effect equilibrium and to insure uniform pressure distribution on the balls.

Figure 10:
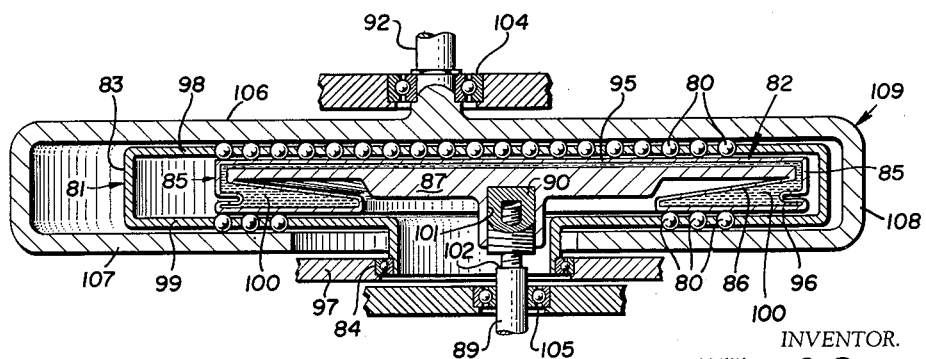
Fig. 10 is a cross section of another form of transmission and pressure applying means in which an expandable disk is employed.

Fig. 10 illustrates another device for applying uniform pressure to a disk and in this modification a gas may be employed to advantage although any fluid may be used. Use of gas at high speeds has the desirable effect of minimizing centrifugal force effects.

The cage 81 of Fig. 10 is in reality two cages having opposite sides 98, 99 each containing balls and joined together by an axially extending peripheral connecting piece or shroud 83. The cage assembly may be rotatably supported on a bearing 84 mounted on housing 97.

The driving disk 82 also comprises two parts cooperating with the cage portions, a circular portion 95 and an annular portion 96 with said portions connected together by a generally cylindrical bellows portion 85.

A relatively large piston 87 is connected to annular portion 96 of the disk by a diaphragm 86 thus defining an annular fluid tight chamber 100. The driving shaft 89 is formed at its end to threadedly engage an internal thread of a nut 90 which is in turn externally threaded and received in a threaded hole 101 in piston 87. The two sets of threads are formed to opposite hands so that as the shaft 89 rotates in one direction the nut bottoms in holes 101 and if it rotates in the opposite direction it engages shoulder 102. In either event the effect is to drive the piston toward the disk portion 95 with a force proportional to the absolute value of the torque and to compress the fluid confined in chamber 100. The uniform pressure created by the compressed fluid bears fairly equally on all of the balls 80 even though the cylindrical bellows portion 85 may deform slightly under load. It should also be noted that the great flexibility of the pressurized disk tends to make it load the balls fairly uniformly, even though the disk itself is not coaxial with the cage.

The balls 80 of both portions 98, 99 of cage 81 are thus pressed into driving engagement with the driven disks 106, 107 which are connected together by a peripheral connecting portion 108 to provide, in effect, a single disk generally designated 109. Said single driven disk is connected to driven shaft 92 which is rotatably supported in suitable bearings such as indicated at 104.

The principal advantage of this type of construction is that the gain in efficiency from having no viscous drag exerted by the loading means tends to offset the loss in efficiency associated with large radius cages. Any thrust developed can be carried efficiently by small thrust bearings 104, 105 on shafts 92, 89 respectively.

Figure 8:
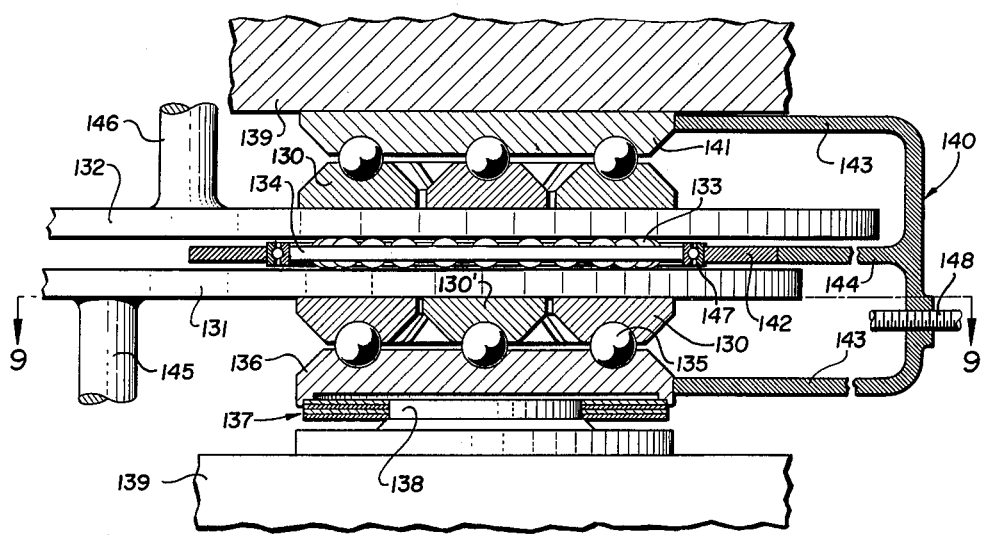
Fig. 8 is a cross section of still another form of transmission illustrating an alternative pressure applying means.
Figure 9:
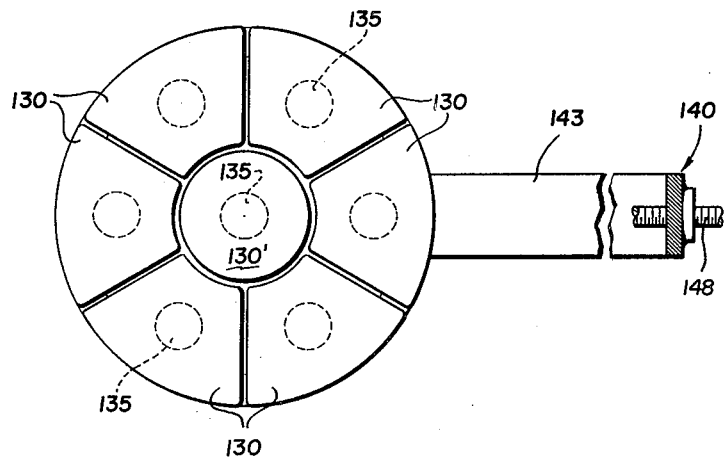
Fig. 9 is a semischematic cross section of the device of Fig. 8, showing the arrangement of the pressure pads.

The loading device of Figs. 8, 9 is constructed so as to exert a substantially uniform pressure over a solid circular rather than an annular circular area. In this case a plurality of segmental slipper pads 130 are arranged around a central pad 130' with each pad backed up by a ball 135 set in socket plates 136, 141.

Socket plates 136, 141 are backed up by suitable external supports 139 and between one of the socket plates and its support a yielding connection may be provided. Thus, in Fig. 8, a pedestal 138 is interposed between socket plate 136 and its support 139. A set of "Belleville" springs 137 may be secured between plate 136 and pedestal 138.

The socket plate 141 and pedestal 138 are slidably supported on their adjacent supports 139 to permit movement of the former together with cage 134 containing balls 133. As indicated in Fig. 8 this action may be effected by means of a support 140 connected to the socket plates 136, 141 by members 143 and with the cage 134 by member 144. Any convenient means such as a jackscrew 148 may be employed to move support 140.

By the above apparatus adjustable speed ratios may be achieved between one shaft 146, its disk 132, and another shaft 145 and its disk 131. In this form of the invention no fluid seal need be used, the supply of lubricant to the slipper pads 130 coming from mist, drop or splash adhering to the surfaces of disks 131, 132. It will be understood of course that the area swept by the balls 133 define the aggregate area loaded by the slipper pads 130 regardless of the shape of the latter.

A number of modifications to this embodiment of the invention are envisaged. In a transmission in which the disks rather than the cage shifts, the pedestal 138 may be integral with the support 139. Or, if it is desired to use torque proportional loading rather than the steady loading of a resilient member, the springs 137 and pedestal 138 would be omitted, and a smooth backed socket plate analagous to plate 136 would then bear slidably against the support 139, to which torque proportional forces would be applied in the manner disclosed in U.S. patent application Serial No. 611,485. This loading method specifies that a force proportional to the driving torque must be applied coaxial with the driven disk, and one proportional to the driven or output torque applied coaxial with the driving disk.

Another obvious modification is to allow a somewhat larger gap between two adjacent shoes 130, to accommodate the shaft of a transmission in cases where the closest approach of cage and disk axes is less than the radius of the cage. In such cases suitable slots for the shaft would also have to be provided in the socket plate 136 and pedestal 138.

It should be apparent that the several features disclosed in each of the embodiments herein depicted and described may be recombined in a variety of ways. For example, the reservoir type of loading device shown in Figs. 1, 2, and 6, 7 could be constructed with other shifting means. Or the eccentrics of Fig. 1, 2 could be eliminated in models utilizing a reservoir but not requiring the disk shaft to intrude into the area swept by the cage balls. Likewise, the fluid referred to throughout could be any suitable gas or liquid. In general, the devices shown herein will operate as well against spherically dished surfaces as against flat ones, and in conjunction with a multicage system as well as a single cage system.

Figure 11:
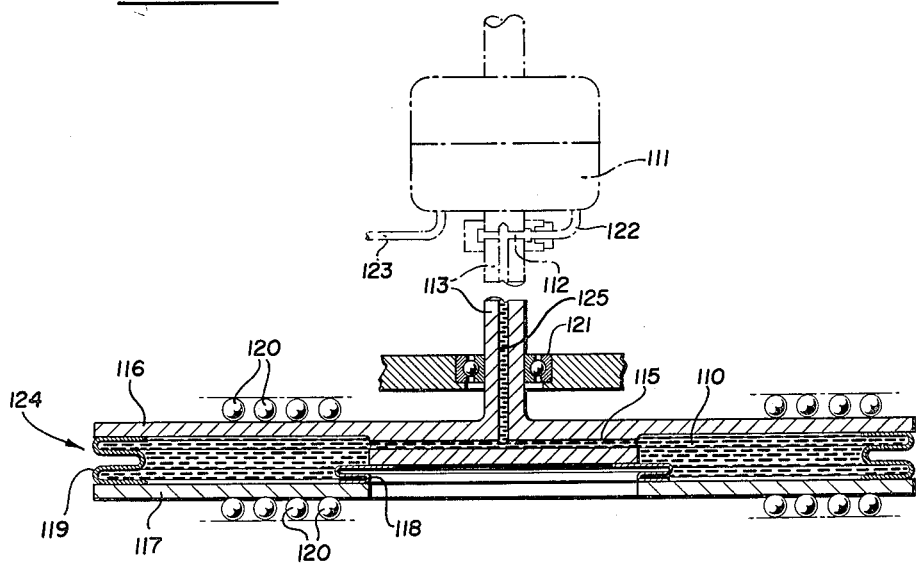
Fig. 11 is a cross section of a portion of a transmission showing another form of expandable disk.

Fig. 11 shows another method of constructing an expandable disk for use in a device similar to Fig. 10. In this case, however, the fluid 110 which exerts uniform pressure on the interior of the disk assembly is supplied continuously by a pump or compressor 111, or may be bled from a combustion chamber of an engine. It passes through a hole 125 in the shaft 113 into a hub and thence through at least one radial hole 115 into the disk interior. One working face 116 of the disk may be integral with the hub, the other face 117 is annular and is connected to the main part of the disk through flexible accordion or bellows-like skirts 118, 119 at the inner and outer peripheries, said skirts being seam welded to the disks 116, 117.

In this construction, if there is approximately the same arrangement of balls 120 in the two parts of the cage, no axial thrust is produced in the supporting bearing 121. Also, if it is desired that the internal fluid pressure be proportional to the torque transmitted through shaft 113, then the pump or compressor 111 may be simply inserted in the shaft, as shown schematically in Fig. 11. Any type of low capacity high pressure positive displacement rotary or reciprocating pump or compressor may be employed, provided the casing is mounted to rotate about the same axis as the rotor (or crankshaft), and the discharge 122 connects to the shaft hole 125. The intake 123 is connected to a supply of the working fluid, which in the arrangement shown would be air, if this is the medium in which the pump or compressor 111 is operating.

Rotor and casing tend to rotate at the same velocity, except for a small differential that tends to pump only enough fluid to make up for leakage. The pressure existing within the pump will be essentially the same as that in the disk 124 and must be proportional to the torque transmitted through the shaft 113.

It is evident that a pressure proportional to torque may be applied to the fluid pressure chamber 1 of Fig. 2 by the above described methods simply by discharging fluid into said chamber through shaft 9 and then by means of a lateral passageway. In such a case a viscosity pump is obviously not required.

It will also be understood that other combinations may be effected in accordance with the above teachings to provide the desired uniform pressure to back up the loading on the torque transmitting balls. For this reason the term "disk" as used herein and in the claims should be understood as defining not only the disks of the type shown in Fig. 2 but also the ball engaging means carried by shafts 89, 92 in Fig. 10 and the head carried by shaft 113 in Fig. 11. The cage 74 (Fig. 7), carried by shaft 72 is of course not considered to be a "disk" since it carries the torque transmitting balls.

An idling disk such as shown at 71 (Fig. 7), although not connected to an external power source or load, transmits power from some balls 73 to others and hence is intended to be encompassed by the term "torque transmitting disk" in the following claims.

Generally the term "disk" is intended to encompass both flat and spherically dished disks.

The sealing means 7 such as indicated in Fig. 2 is obviously not the only type of sealing means that can be used as it is obvious that an O-ring or a balanced face seal may be employed for the same purpose.

The specific embodiments of the invention herein described in detail should not be taken as restrictive of the invention, as it is obvious that various modifications in design may be resorted to by those skilled in the art without departing from the spirit of the invention or from the scope of the following claims.

I claim:

1. In a transmission of the type having a torque transmitting disk engaged at one side thereof by a plurality of balls housed in a rotatable cage, means on the opposite side of said disk for applying a substantially uniform pressure to said opposite side over an area substantially coextensive with the projected area of the portion of said cage containing said balls whereby substantially uniform loading is applied to said balls.

2. In a transmission of the type having a torque transmitting disk engaged at one side thereof by a plurality of balls housed in a rotatable cage, means on the opposite side of said disk for applying a substantially uniform fluid pressure to said opposite side over an area substantially coextensive with the projected area of the portion of said cage containing said balls whereby substantially uniform loading is applied to said balls.

3. In a transmission of the type having a torque transmitting disk engaged at one side thereof by a plurality of balls housed in a rotatable cage, means on the opposite side of said disk for applying a substantially uniform fluid pressure to said opposite side over an area substantially coextensive with the projected area of the portion of said cage containing said balls, said means including a chamber having one side formed by said opposite side, sealing means carried by said first mentioned means in sealing engagement with said opposite side, and means for supplying fluid under pressure to said chamber to develop said uniform fluid pressure.

4. In a transmission of the type having a torque transmitting disk engaged at one side thereof by a plurality of balls housed in a rotatable cage, means on the opposite side of said disk for applying a substantially uniform pressure to said opposite side over an area substantially coextensive with the projected area of the portion of said cage containing said balls, said means comprising a plurality of pressure pads in sliding engagement with said opposite side.

5. In a transmission that includes a pair of rotatable disks between which is interposed a cage containing a plurality of torque transmitting balls in rolling engagement with said disks, means on the opposite side of one of said disks from said balls for applying a substantially uniform pressure over an area of said disks substantially coextensive with the area of said cage containing said balls for urging said disks into engagement with said balls.

6. A transmission for connecting a pair of rotatable shafts comprising a pair of disks, a cage interposed between said disks and provided with a plurality of torque transmitting balls in engagement at their opposite sides with said disks, pressure applying means on the opposite sides of said disks from said balls for urging said disks toward each other and into frictional engagement with said balls, said means acting to apply a substantially uniform pressure to said disks over an area substantially coextensive with the area of said cage occupied by said balls, and adjusting means for moving said pressure applying means and said cage as a unit for varying the speed ratio of said shafts.

7. A transmission for connecting a pair of rotatable shafts comprising: a fluid tight expandable chamber carried by one end of one of said shafts and provided with a pair of opposite sides extending substantially at right angles to said one shaft, a disk on the other of said shafts formed to provide a pair of surfaces in opposed relation to said sides of said chamber, a rotatably supported cage provided with a plurality of torque transmitting balls interposed between the sides of said chamber and said surfaces, means for applying a fluid pressure to said chamber for urging said opposite sides oppositely outwardly against said balls.

8. A transmission for connecting a pair of rotatable shafts comprising: a fluid tight expandable chamber carried by one end of one of said shafts and provided with a pair of opposite sides extending at right angles to said one shaft, a disk on the other of said shafts formed to provide a pair of surfaces in opposed relation to said sides of said chamber, a rotatably supported cage provided with a plurality of torque transmitting balls interposed between the sides of said chamber and said surfaces, means for applying a fluid pressure to said chamber for urging said opposite sides oppositely outwardly against said balls, torque responsive means connected to said one shaft for applying said fluid pressure in an amount proportional to the torque in said one shaft whereby the force on said balls is proportional to such torque.

9. A transmission for connecting a pair of rotatable shafts comprising: a fluid tight expandable chamber carried by one end of one of said shafts and provided with a pair of opposite sides extending at right angles to said one shaft, a disk on the other of said shafts formed to provide a pair of surfaces in opposed relation to said sides of said chamber, a rotatably supported cage provided with a plurality of torque transmitting balls interposed between the sides of said chamber and said surfaces, means for applying a fluid pressure to said chamber for urging said opposite sides oppositely outwardly against said balls, said means including a conduit in said one shaft communicating with the interior of said chamber and through which fluid is applied to said chamber.

10. In a transmission of the type having a torque transmitting disk engaged at one side thereof by a plurality of balls arranged within a predetermined area and supported for rolling engagement with said one side at spaced points within said area, a chamber on the opposite side of said disk from said one side with one side of said chamber defined by said opposite side, means for applying fluid under pressure to the interior of said chamber, sealing means for effecting a fluid seal around the periphery of said one side of said chamber and in sliding engagement with said opposite side of said disk, said sealing means defining an area coextensive with said first mentioned area whereby a uniform loading is applied by said disk to said balls.

11. In a transmission of the type having a torque transmitting disk engaged at one side thereof by a plurality of balls arranged within a predetermined area and supported for rolling engagement with said one side at spaced points within said area, a chamber on the opposite side of said disk from said one side with one side of said chamber defined by said opposite side, a peripheral seal on said chamber in sliding engagement with said opposite side of said disk during rotation of said disk, said seal encompassing an area substantially coextensive with said first mentioned area whereby fluid pressure in said chamber applies a uniform loading to said balls through said disk, means for applying fluid pressure to said chamber comprising a viscosity pump mounted in said chamber and in sliding engagement with the said opposite side of said disk.

12. In a transmission, a pair of rotatably supported disks in parallel opposed relationship, a cage interposed between said disks, a plurality of torque transmitting balls rotatably mounted at spaced points in said cage and in rolling engagement with the opposed faces of said disks upon rotation of the latter, fluid chambers mounted adjacent the opposite faces of said disks and having open sides defined by said opposite faces respectively, sealing means for effecting a fluid tight seal between said open sides and said opposite faces, said sealing means each encompassing an area substantially coextensive with the projected area of said cage that contains said balls whereby fluid pressure in said chambers applies a uniform loading to said balls through said disks and means for supplying fluid under pressure to said chambers.

13. In a transmission, a pair of rotatably supported disks in parallel opposed relationship, a cage interposed between said disks, a plurality of torque transmitting balls rotatably mounted at spaced points in said cage and in rolling engagement with the opposed inner faces of said disks upon rotation of the latter, a fluid chamber mounted adjacent the outer face of one of said disks and having an open side defined by said outer face, sealing means for effecting a fluid tight seal between said open side and said outer face, said sealing means encompassing an area substantially coextensive with the projected area of said cage that contains said balls whereby fluid pressure in said chamber applies a uniform loading to said balls through said one disk, means for supplying fluid under pressure to said chamber, and means for relatively moving one of said disks and said cage during said rotation.

14. In a transmission, a pair of rotatably supported disks in parallel opposed relationship, a cage interposed between said disks, a plurality of torque transmitting balls rotatably mounted at spaced points in said cage and in rolling engagement with the opposed inner faces of said disks upon rotation of the latter, a fluid chamber mounted adjacent the outer face of one of said disks and having an open side defined by said outer face, sealing means for effecting a fluid tight seal between said open side and said outer face, said sealing means encompassing an area substantially coextensive with the projected area of said cage that contains said balls whereby fluid pressure in said chamber applies a uniform loading to said balls through said one disk means for supplying fluid under pressure to said chamber, one of said disks being provided with an integral shaft at right angles thereto, means for rotatably supporting said shaft, and means for shifting said shaft relative to said cage during said rotation.

15. In a transmission, a pair of rotatably supported disks in parallel opposed relationship, a cage interposed between said disks, a plurality of torque transmitting balls rotatably mounted at spaced points in said cage and in rolling engagement with the opposed inner faces of said disks upon rotation of the latter, a fluid chamber mounted adjacent the outer face of one of said disks and having an open side defined by said outer face, sealing means for effecting a fluid tight seal between said open side and said outer face, said sealing means encompassing an area substantially coextensive with the projected area of said cage that contains said balls whereby fluid pressure in said chamber applies a uniform loading to said balls through said one disk, and means for supplying fluid under pressure to said chamber, a shaft secured to one of said disks and extending through said chamber, means for shifting said shaft relative to said one chamber during said rotation including eccentric elements rotatably supported in the side of said one chamber opposite its open side and provided with fluid seals to prevent leakage from said one chamber.

16. In a transmission, a pair of rotatably supported disks in parallel opposed relationship, a cage interposed between said disks, a plurality of torque transmitting balls rotatably mounted at spaced points in said cage and in rolling engagement with the opposed inner faces of said disks upon rotation of the latter, a fluid chamber mounted adjacent the outer face of one of said disks and having an open side defined by said outer face, sealing means for effecting a fluid tight seal between said open side and said outer face, said sealing means encompassing an area substantially coextensive with the projected area of said cage that contains said balls whereby fluid pressure in said chamber applies a uniform loading to said balls through said one disk and means for supplying fluid under pressure to said chamber, a shaft connected to said transmission for transmitting power, said means for supplying fluid, including a fluid pump, said fluid pump having a pressure developing element actuated by said shaft.

17. In a transmission, a pair of rotatably supported disks in parallel opposed relationship, a cage interposed between said disks, a plurality of torque transmitting balls rotatably mounted at spaced points in said cage and in rolling engagement with the opposed inner faces of said disks upon rotation of the latter, a fluid chamber mounted adjacent the outer face of one of said disks and having an open side defined by said outer face, sealing means for effecting a fluid tight seal between said open side and said outer face, said sealing means encompassing an area substantially coextensive with the projected area of said cage that contains said balls whereby fluid pressure in said chamber applies a uniform loading to said balls through said one disk, and means for supplying fluid under pressure to said chamber, a shaft connected to said transmission for transmitting power, and torque responsive means connected to said shaft, said means for applying fluid pressure including a fluid pump having a pressure developing element actuated by said torque responsive means whereby the fluid pressure in said chamber is proportional to such torque.

References Cited in the file of this patent

UNITED STATES PATENTS

| | | |
|---|---|---|
| 888,265 | Ruland | May 19, 1908 |
| 1,317,916 | Ford | Oct. 7, 1919 |
| 2,014,922 | Almen | Sept. 17, 1935 |
| 2,783,653 | Brown | Mar. 5, 1957 |

FOREIGN PATENTS

| | | |
|---|---|---|
| 928,749 | Germany | June 10, 1955 |